United States Patent
Angermaier

(10) Patent No.: US 7,191,883 B2
(45) Date of Patent: Mar. 20, 2007

(54) ELECTROMAGNETICALLY CONTROLLED FLUID FRICTION COUPLING

(75) Inventor: Jörg Angermaier, Illingen-Schützingen (DE)

(73) Assignee: Behr GmbH & Co. KG, Stuttgart (DE)

( * ) Notice: Subject to any disclaimer, the term of this patent is extended or adjusted under 35 U.S.C. 154(b) by 0 days.

(21) Appl. No.: 10/496,462

(22) PCT Filed: Nov. 19, 2002

(86) PCT No.: PCT/EP02/12927

§ 371 (c)(1),
(2), (4) Date: Jul. 21, 2004

(87) PCT Pub. No.: WO03/046399

PCT Pub. Date: Jun. 5, 2003

(65) Prior Publication Data

US 2005/0029069 A1    Feb. 10, 2005

(30) Foreign Application Priority Data

Nov. 24, 2001    (DE) ................................ 101 57 822

(51) Int. Cl.
*F16D 35/02*    (2006.01)
(52) U.S. Cl. ................... 192/58.61; 192/58.8
(58) Field of Classification Search ............ 192/58.61, 192/58.8
See application file for complete search history.

(56) References Cited

U.S. PATENT DOCUMENTS

| | | | | |
|---|---|---|---|---|
| 4,271,945 A | * | 6/1981 | Budinski | 192/58.61 |
| 4,556,138 A | * | 12/1985 | Martin et al. | 192/58.61 |
| 4,850,465 A | * | 7/1989 | Ono | 192/58.8 |
| 4,987,986 A | | 1/1991 | Kennedy et al. | |
| 5,152,383 A | | 10/1992 | Boyer et al. | |
| 5,555,963 A | * | 9/1996 | Martin | 192/58.61 |
| 5,722,523 A | | 3/1998 | Martin | |
| 5,992,594 A | * | 11/1999 | Herrle et al. | 192/58.61 |
| 6,419,064 B1 | * | 7/2002 | Krammer | 192/58.61 |
| 6,443,283 B1 | | 9/2002 | Augenstein et al. | |
| 6,530,462 B2 | | 3/2003 | Lutz | |

FOREIGN PATENT DOCUMENTS

| | | |
|---|---|---|
| DE | 31 48 872 A1 | 6/1983 |
| DE | 32 43 967 A1 | 5/1984 |
| DE | 38 23 871 A1 | 1/1990 |
| DE | 40 23 394 A1 | 2/1991 |
| DE | 39 41 834 A1 | 6/1991 |
| DE | 198 42 343 A1 | 3/2000 |
| DE | 199 25 132 A1 | 12/2000 |
| DE | 100 12 648 A1 | 10/2001 |
| EP | 0 562 226 A1 * | 9/1993 |

* cited by examiner

*Primary Examiner*—Rodney H. Bonck
(74) *Attorney, Agent, or Firm*—Foley & Lardner LLP

(57) ABSTRACT

The invention relates to a fluid friction coupling comprising a drive shaft (2) and a drive disk (4) which is rotationally fixed thereon, in addition to a drive housing (5) which is rotationally arranged on the drive shaft (2). The drive disk forms a working area (7) and a storage area (9) enabling a fluidic connection for a viscous medium via a feed hole (11) and a return channel (8). The feed hole (11) is controlled by a valve lever (12) with an anchor plate (14) by means of an electromagnet (19) arranged on the near side of the coupling. According to the invention, the valve lever (12) is arranged between the drive disk (4) and the electromagnet (19) and the anchor plate (14) is arranged in the magnetic flow area of the electromagnet (19, 20).

11 Claims, 1 Drawing Sheet

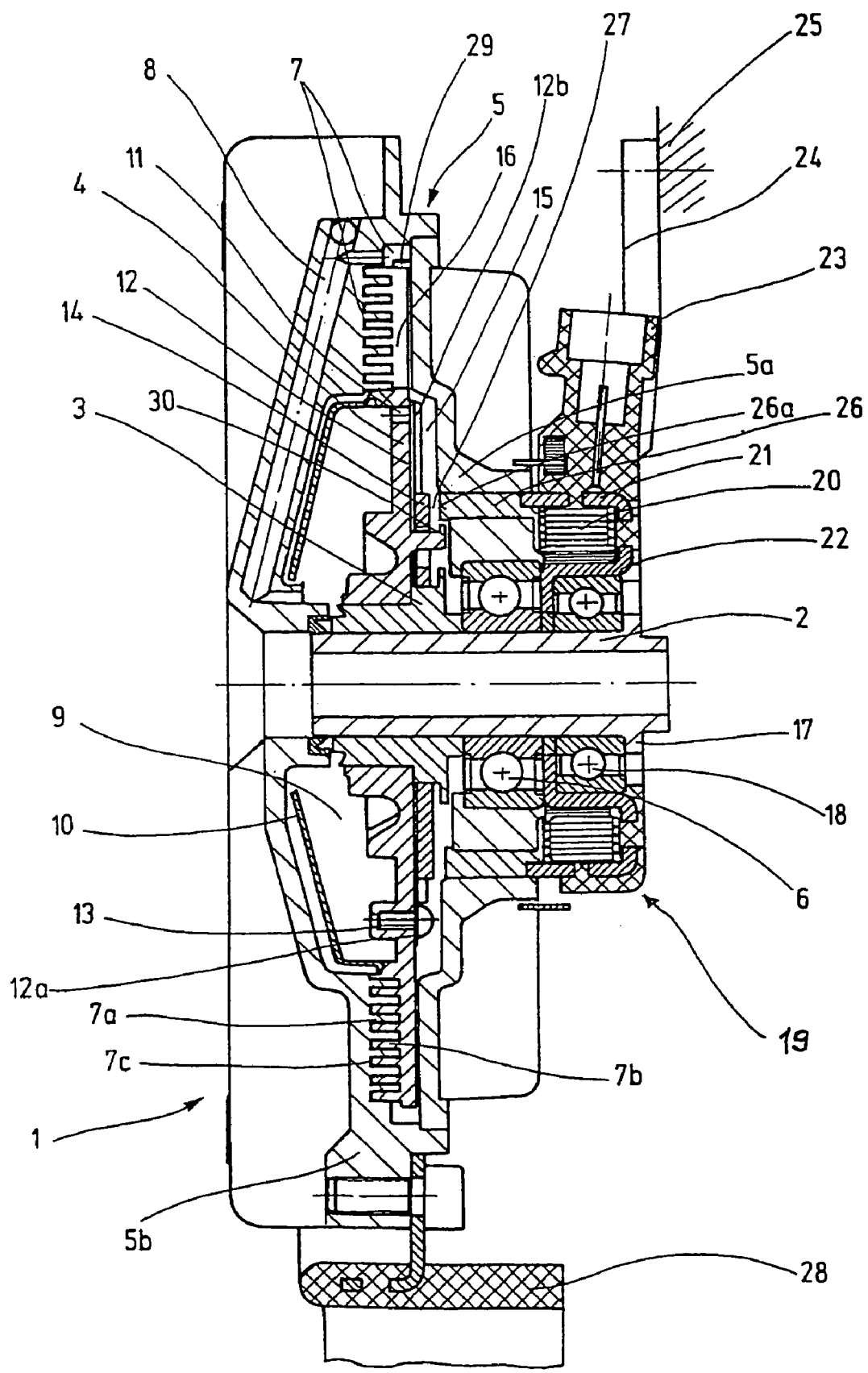

ELECTROMAGNETICALLY CONTROLLED FLUID FRICTION COUPLING

The invention relates to a fluid friction coupling. Such a coupling has been disclosed by DE-A 199 25 132.

In this known fluid friction coupling a valve lever, which controls the circulation of a viscous medium through the coupling, is controlled by an electromagnet, which is rotatably arranged on the rear side of the coupling, that is to say to the side of the drive engine. The valve lever, on the other hand, is situated on the front of the coupling, that is to say on the side remote from the engine and the electromagnet in front of the drive disk (primary disk) of the coupling. The magnetic flux from the coil of the electromagnet to the valve lever, which has an armature base plate, is by way of specially designed conducting rings, which are composed of magnetically conductive material and are partially cast into the body of the coupling. A disadvantage with this magnetic flux conduction is that a relatively large number of parts is needed for the magnetic flux conduction and that the coupling has a relatively large overall depth.

The object of the present invention is to reduce the overall depth of the aforementioned fluid friction coupling and to improve the magnetic flux, in order thereby to reduce the energy expenditure for the coil of the electromagnet.

Arranging the valve lever between drive disk and electromagnetic coil shortens the path of the magnetic flux between coil and armature base plate of the valve lever, that is to say the magnetization losses and the energy expenditure for the coil are reduced. At the same time the overall axial depth of the coupling is shortened.

Although DE-A 32 43 967 has already disclosed a fluid friction coupling with electromagnetic control of a valve lever, which is arranged between primary disk and electromagnetic coil, this coupling exhibits considerable differences with regard to the arrangement of the electromagnet and the magnetic flux conduction via so-called pole rings, as well as the position of reservoir chamber and working chamber, the differences resulting, among other things, in a relatively large overall depth.

According to one advantageous further embodiment of the invention the reservoir chamber for holding the viscous fluid is arranged on the front of the drive disk, whilst an intermediate chamber which has a fluid connection to the working chamber is situated on the rear side. This design means that the viscous medium is fed radially inwards to radially outwards to the working chamber, that is to say under the effect of centrifugal force and on the rear side of the drive disk. This ensures a proper supply of viscous fluid to the working chamber and reliable activation of the coupling.

According to a further advantageous development of the invention the valve lever with its armature base plate is fixed to the drive disk, in which the feed hole is also arranged. This produces a compact construction.

Further advantageous developments of the invention are set forth in the dependent claims.

An example of an embodiment of the invention is shown in the drawing and is described in more detail below. In the drawing The FIGURE shows a section through a fluid friction coupling.

FIGURE (the single FIGURE) shows a sectional representation of a fluid friction coupling 1. The coupling 1 comprises a drive part and an output part, the drive part being formed by a drive shaft designed as hollow shaft 2, a hub 3 fixed thereto and a drive disk 4 fixed on the hub 3. The output part of the coupling 1 comprises a two-part coupling housing 5, which is formed from a body 5a and a cover 5b. The body 5a is rotatably supported on the hollow shaft 2 by means of a deep-groove ball bearing 6. The coupling housing 5 together with the drive disk 4 forms a working chamber or shear chamber 7 which, as is known in the art, is formed by annular ribs 7a on the output side 5b and annular ribs 7b on the drive side 4. The annular ribs 7a and 7b form a meander-shaped labyrinth gap 7c, containing shear fluid, that is to say a viscous medium. From the working chamber 7 a return duct 8 in the coupling cover 5b leads into a reservoir chamber 9, which is formed by the drive disk 4 on the one hand, and on the other by an intermediate disk 10 affixed thereto. The reservoir chamber 9 therefore rotates with the drive disk 4. In the drive disk 4, radially inside the labyrinth gap 7c, is a feed hole 11, which leads from the front of the drive disk 4 to the rear side. A valve lever 12, which with its (in the drawing) lower end 12a is fixed to the drive disk 4 by means of rivet 13, is arranged on the rear side of the drive disk 4. An armature base plate 14 is fixed on the valve lever 12. The valve lever 12 is of flexible design and under its own internal stress, especially at its (in the drawing) upper end 12b, bears on the drive disk 4 in the area of the feed hole 11, and closes the latter. Between the rear side of the drive disk 4 and the body 5a is an intermediate chamber 15, which leads via duct 16 running radially in the drive disk 4 into the working chamber 7. The drive disk 4 has a plurality of ducts 16 evenly distributed over the circumference, which are not discernible from this sectional representation.

A magnet assembly 19 is rotatably supported on the hollow shaft 2 immediately next to the body 5a by means of a deep-groove ball bearing 18 which is axially fixed on the hollow shaft 2 by way of a flange 17. The magnet assembly 19 comprises a coil 20, which is enclosed by a radially outer magnet casing 21 and a radially inner magnet casing 22. Current is fed to the coil 20 via a connection part 23 formed in plastics. The overall magnet assembly 19 with connection part 23 is fixedly supported by way of a schematically represented torsional brace 24, for example on the engine housing 25. At the radial height of the outer magnet casing 21 a steel insert 26 is cast in the body 5a, which is made of an aluminum alloy, said insert exercising the function of a conducting ring for the magnetic flux. The end 26a of the steel insert 26 emerging from the body 5a into the intermediate chamber 15 is situated directly opposite the armature base plate 14 of the valve lever 12 and between them is a gap 27.

The coupling 1 is connected to the drive shaft (not shown in the drawing) of an engine or a coolant pump shaft of an internal combustion engine by means of a fixing bolt (likewise not shown) inserted through the hollow shaft 2, as is described and represented in more detail, for example, in DE-A 31 48 872 filed by the present applicant. Fixed to the housing 5b of the coupling 1 is a fan 28 (partially shown), which serves to deliver ambient air through a radiator (not shown) for the coolant circuit of an internal combustion engine of a motor vehicle.

When the hollow shaft 2 and hence the drive disk 4 are being driven, the viscous fluid, a silicone oil, present in the reservoir chamber 9 is forced outwards by centrifugal force and in the reservoir chamber 9 forms a fluid ring, which when the feed hole 11 is closed by the valve lever 12 is retained in the reservoir chamber 9. That is to say no silicone oil flows into the working chamber 7. Instead, the silicone oil present in the working chamber 7 is pumped out by a choke element 29 and is delivered by way of the return duct 8 into the reservoir chamber 9. The coupling thereby switches off, because there is no longer any silicone oil in the labyrinth gap 7c and hence no further torque is transmitted. Should the coupling be switched on in order to drive the fan 28, the magnetic coil 20 is energized, so that a magnetic flux is formed via the steel insert 26 towards the armature base plate 14 and pulls this to the right. The valve lever 12 is thereby lifted off from the feed hole 11, and the viscous medium under the action of the centrifugal force now flows via the intermediate chamber 15 and the duct 16 into the working chamber 7, so that the coupling is switched on. When the armature base plate 14 is attracted by the magnetic coil 20, it must be ensured that the end 26a of the steel insert 26 and the armature base plate 14 do not come into contact, since the two parts are rotating at different speeds. This is ensured by means of a stop 30 on the drive disk 4 or on the coupling hub 3.

When the coil 20 is energized, a closed ring forms for the magnetic flux, which starting at the magnetic coil runs via the outer magnet casing 21 and the steel insert 26 into the armature base plate 14 and thence via a partial area of the hub 3 and the hollow shaft 2 back into the inner magnet casing 22. In this way a short and effective magnetic flux conduction is achieved, so that a small coil is sufficient to actuate the valve lever with a low energy expenditure.

LIST OF REFERENCE NUMERALS

1 Fluid friction coupling
2 Hollow shaft
3 Hub
4 Drive disk
5 Output housing
5a Body
5b Cover
6 Deep-groove ball bearing
7 Working chamber
7a Annular rib, output side
7b Annular rib, drive side
7c Labyrinth gap
8 Return duct
9 Reservoir chamber
10 Intermediate disk
11 Feed hole
12 Valve lever
13 Rivet
14 Armature base plate
15 Intermediate chamber
16 Feed duct
17 Flange on hollow shaft
18 Deep-groove ball bearing
19 Electromagnet assembly
20 Coil
21 Outer magnet casing
22 Inner magnet casing
23 Connection part
24 Torqsional brace
25 Engine block
26 Steel insert
26a End of steel insert
27 Gap
28 Fan
29 Choke element
30 Stop

The invention claimed is:

1. A fluid friction coupling, comprising:
a drive shaft;
a drive disk, wherein the drive disk is rotationally fixed to the drive shaft;
an output housing, wherein the output housing is rotatably supported on the drive shaft, wherein the drive disk and the output housing form a working chamber and a reservoir chamber, which between them have a fluid connection for a viscous medium by way of a feed hole and a return duct;
an armature base plate;
a valve lever; and
a steel insert, wherein the steel insert is integral to the output housing and the steel insert is arranged in an area of magnetic flux of an electromagnet;
wherein the feed hole is adapted to be controllable via the valve lever with the armature base plate by the electromagnet;
wherein the valve lever is arranged between the drive disk and the electromagnet;
wherein the armature base plate is arranged in a magnetic flux area of the electromagnet;
wherein the valve lever is fixed to the drive disk.

2. The fluid friction coupling as claimed in claim 1, wherein the valve lever is fixed by an end of the valve lever that is diametrically opposed to the feed hole to the drive disk and under spring tension bears on the drive disk in the area of the feed hole.

3. The fluid friction coupling as claimed in claim 1, wherein the drive shaft is designed as a hollow shaft to accommodate a central fixing bolt.

4. The fluid friction coupling as claimed in claim 1, wherein the output housing comprises an aluminum body and the steel insert is cast in the output housing.

5. The fluid friction coupling as claimed in claim 1, wherein the coupling is adapted to produce magnetic flux that forms a substantially closed ring incorporating an outer magnet casing enclosing the electromagnet, the steel insert, the armature base plate, a partial area of a coupling hub, the drive shaft and an inner magnet casing.

6. The fluid friction coupling as claimed in claim 1, wherein the armature base plate and the steel insert are arranged to form a gap between the armature base plate and the steel insert that is maintained when the electromagnet is energized and when the electromagnet is not energized.

7. The fluid friction coupling as claimed in claim 1, wherein the coupling includes a stop that is arranged to prevent the steel insert from contacting the armature base plate.

8. A fluid friction coupling, comprising:
a drive shaft;
a drive disk, wherein the drive disk is rotationally fixed to the drive shaft;
an output housing, wherein the output housing is rotatably supported on the drive shaft, wherein the drive disk and the output housing form a working chamber and a reservoir chamber, which between them have a fluid connection for a viscous medium by way of a feed hole and a return duct;
an armature base plate;
a valve lever; and
a steel insert, wherein the steel insert is integral to the output housing and the steel insert is arranged in an area of magnetic flux of an electromagnet;

wherein the feed hole is adapted to be controllable via the valve lever with the armature base plate by the electromagnet;

wherein the valve lever is arranged between the drive disk and the electromagnet;

wherein the armature base plate is arranged in a magnetic flux area of the electromagnet;

wherein the reservoir chamber for holding fluid flowing back from the working chamber is arranged on a side of the drive disk opposite to a side of the drive disk that the valve lever is arranged, wherein the feed hole is arranged in the drive disk and an intermediate chamber, which has a fluid connection to the working chamber, is arranged on the side of the drive disk that the valve lever is arranged on.

9. The fluid friction coupling as claimed in claim 8, wherein the intermediate chamber is connected by radial feed ducts to the working chamber.

10. The fluid friction coupling as claimed in claim 8, wherein the armature base plate and the steel insert are arranged to form a gap between the armature base plate and the steel insert that is maintained when the electromagnet is energized and when the electromagnet is not energized.

11. The fluid friction coupling as claimed in claim 8, wherein the coupling includes a stop that is arranged to prevent the steel insert from contacting the armature base plate.

* * * * *